(No Model.)

L. E. HOFFMAN.
BICYCLE.

No. 531,798. Patented Jan. 1, 1895.

WITNESSES.
F. Griswold
Helen M. Wood

INVENTOR.
Louis E. Hoffman
By Edwin L. Thurston
his atty.

UNITED STATES PATENT OFFICE.

LOUIS E. HOFFMAN, OF CLEVELAND, OHIO.

BICYCLE.

SPECIFICATION forming part of Letters Patent No. 531,798, dated January 1, 1895.

Application filed October 30, 1894. Serial No. 527,418. (No model.)

*To all whom it may concern:*

Be it known that I, LOUIS E. HOFFMAN, a citizen of the United States, residing at Cleveland, in the county of Cuyahoga and State of Ohio, have invented certain new and useful Improvements in Bicycles; and I do hereby declare the following to be a full, clear, and exact description of the invention, such as will enable others skilled in the art to which it appertains to make and use the same.

My invention relates to the steering head of a bicycle.

The object is to provide simple and novel means for locking the adjustable ball bearing cup so that it cannot work loose, and for attaching the handle bar stem to the fork head; and the invention consists in the construction and combination of parts shown and described and pointed out definitely in the claims.

Figure 1:
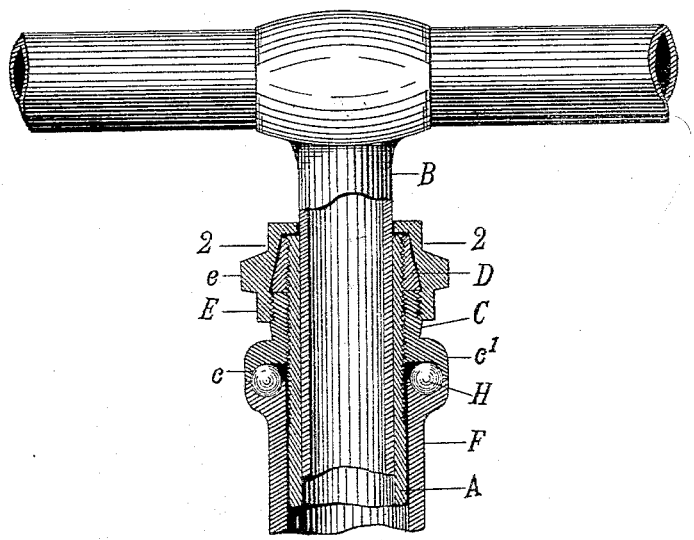
Figure 2:
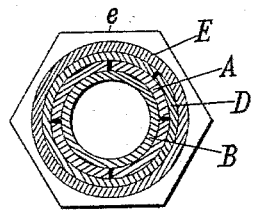

In the drawings, Figure 1 is a central vertical section of the upper end of the steering head. Fig. 2 is a horizontal sectional view on line 2—2 of Fig. 1.

Referring to the parts by letters, A represents the tubular fork head which is split at its upper end so that said end may be compressed and thereby clamp the stem B of the handle bar. The fork head is mounted on ball bearings in the steering sleeve F in the usual manner. The fork head is externally screw threaded; and a sleeve C having on its lower end the adjustable cup c of the ball bearings, is screwed onto said fork head until the proper pressure is put upon the balls H.

D represents a split collar made of thin steel. It has internal screw threads, whereby it is screwed onto the fork head above the sleeve C, and it is tapered externally being smallest in diameter at the upper end.

E represents a sleeve screw threaded at its lower end and thereby adapted to screw onto the upper threaded end of the sleeve C. The hole in this sleeve is tapered and adapted to engage with the tapered exterior of the collar D.

A nut e is formed on the outside of the sleeve so that it may be turned by a wrench; and a milled flange c' is preferably formed on the sleeve C, so that it may be easily turned or held from turning.

The mode of operation of the described parts is as follows: The sleeve C is screwed down until the proper pressure is put upon the balls. The split collar D is then screwed onto the fork head down against or near to the sleeve C. Then the sleeve E is screwed onto the sleeve C, and it will be found that said sleeve may be easily held while this is being done. The tapered bore of the collar E engages with the tapered collar D, and the result of such engagement will be to first screw the collar D down hard against the sleeve C, where it will act as a jam nut to prevent said sleeve from unscrewing. As the sleeve E is screwed down farther it compresses the split collar D, and that in turn compresses the split upper end of the fork head, causing it to clamp the stem of the handle bar.

Having described my invention, I claim—

1. The combination of a tubular fork head split at its upper end and having exterior screw threads, a sleeve C which screws onto said fork head and is itself threaded exteriorly, a split tapered collar D which encircles said fork head above said sleeve, and a sleeve E having a tapered bore which engages with said tapered collar and has a threaded lower end which screws onto the sleeve C, substantially as and for the purpose specified.

2. The combination of the tubular fork head split at its upper end and exteriorly threaded, a sleeve C which screws onto said fork head and has exterior threads on its upper end, a split tapered collar D which screws onto the fork head, and a sleeve E having a tapered bore and a threaded lower end which screws onto the sleeve C, substantially as and for the purpose specified.

In testimony whereof I affix my signature in presence of two witnesses.

LOUIS E. HOFFMAN.

Witnesses:
W. T. BLACK,
L. F. GRISWOLD.